United States Patent [19]

Marum

[11] Patent Number: 4,800,302

[45] Date of Patent: Jan. 24, 1989

[54] REDUNDANCY SYSTEM WITH DISTRIBUTED MAPPING

[75] Inventor: John R. Marum, Stanford, Calif.

[73] Assignee: TRW Inc., Redondo Beach, Calif.

[21] Appl. No.: 74,602

[22] Filed: Jul. 17, 1987

[51] Int. Cl.$^4$ ............................................. H03K 19/003
[52] U.S. Cl. ..................................... 307/441; 307/219; 307/465; 365/230
[58] Field of Search ................ 307/441, 443, 465–469, 307/219; 340/825.01, 825.07; 365/200, 230; 371/7–10

[56] References Cited

U.S. PATENT DOCUMENTS

| | | | |
|---|---|---|---|
| 3,860,831 | 1/1975 | Goser | 307/441 X |
| 3,937,936 | 2/1976 | Saporito et al. | 307/441 X |
| 4,112,502 | 9/1978 | Scheuneman | 371/7 X |
| 4,389,715 | 6/1983 | Eaton, Jr. et al. | 371/8 X |
| 4,551,814 | 11/1985 | Moore et al. | 307/465 X |

FOREIGN PATENT DOCUMENTS 0212846 12/1982 Japan ....................................... 371/7

*Primary Examiner*—David Hudspeth
*Attorney, Agent, or Firm*—Noel F. Heal; Robert W. Keller

[57] ABSTRACT

An electronic system having multiple identical subsystems, some of which can be excluded from the system when defective or held as spares. A mapping circuit associated with each subsystem has a first register for storing a physical address of the subsystem and a second register for storing a logical address. To configure the system to include a selection of subsystems, pairs of physical and corresponding logical addresses are transmitted to the subsystem mapping circuits. When a transmitted physical address matches the address stored in the first register, the second register is enabled to receive a transmitted logical address. The mapping of physical to logical address is therefore distributed among all of the subsystems rather than being handled in a central mapping unit. Subsystems that are to remain out of service have a null address stored in their second registers. In normal operation of the entire system, a logical address transmitted to the subsystems is compared with the logical address stored in each second register, and only the matching subsystem is selected for operation.

20 Claims, 2 Drawing Sheets

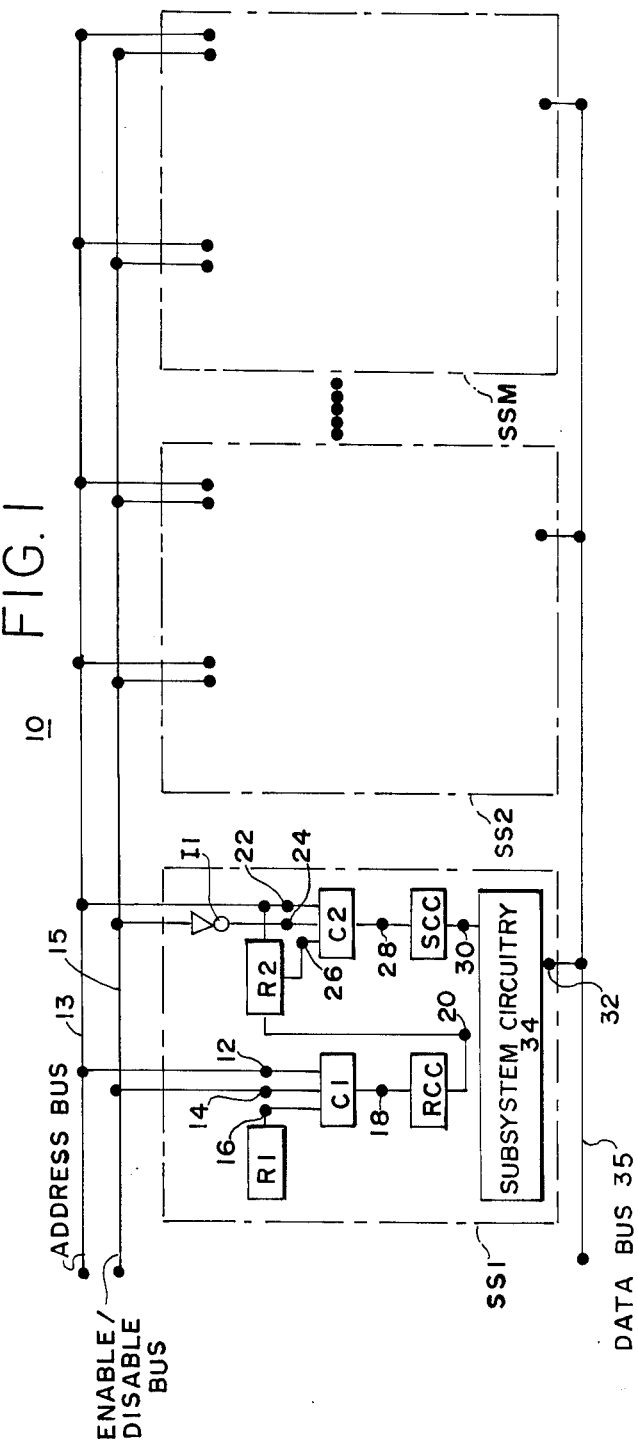
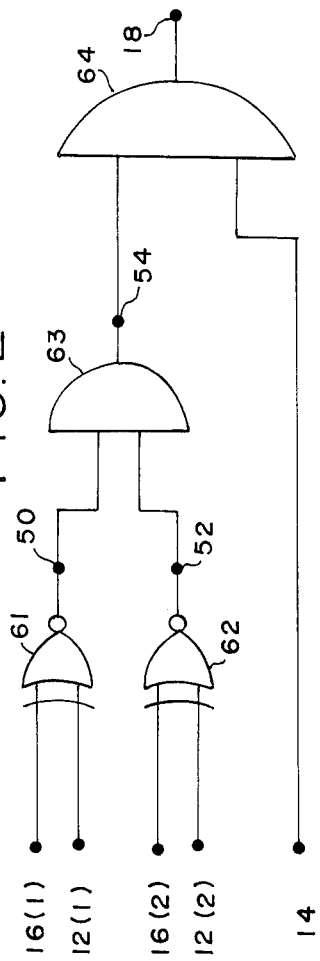

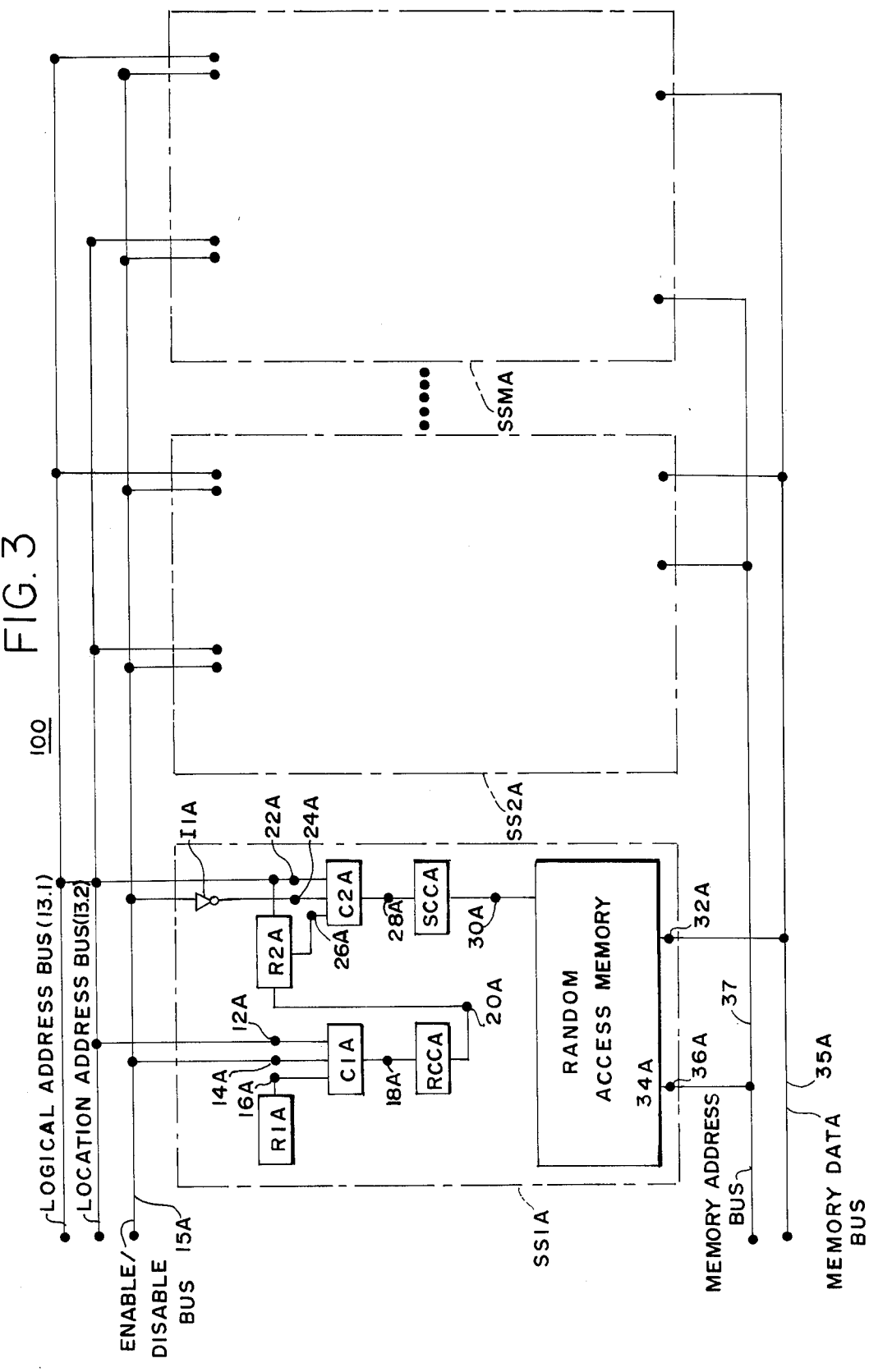

REDUNDANCY SYSTEM WITH DISTRIBUTED MAPPING

BACKGROUND OF THE INVENTION

This invention relates generally to redundancy systems and, more specifically, to electronic systems having multiple subsystems or modules, some of which are non-functioning or spare modules.

Many large electronic systems, including wafer-scale integrated circuits and single-chip high capacity random access memories, are fabricated to include spare subsystems or circuit modules that can be used as replacements for defective modules. Modules may be rendered defective during fabrication, or after long periods of use, or upon sustaining physical damage. In any event, it is desirable to be able to reconfigure a system to include a required number of operational modules. The specific function performed by a module is not important from the standpoint of this invention. The modules may be, for example, memory cells or address decoders in a computer system, or they could perform any of a variety of other functions.

One technique for configuring a system to include operational modules is to include fusible links in the integrated circuit chip on which the modules are fabricated. The links can typically be opened by electrical or optical means, but their use has some drawbacks. First, the presence of these links complicates the fabrication process and can lower production yields. Also, the blowing open of fusible links can expose the surface of a chip or wafer to contaminants that degrade circuit performance or prevent proper operation.

Another approach to this problem is to use a central interconnection circuit or mapping unit. The central mapping unit contains a table that relates logical unit numbers or addresses to the physical positions of actual modules. One problem that arises from the use of a central mapping unit is that its complexity and physical size increase geometrically with respect to the number of modules or subsystems that it handles. Another problem is that central mapping units impose delay times that degrade system performance, especially for large numbers of modules.

Accordingly, there is still a need in electronic systems using redundancy, for a technique that will interconnect functional subsystems or modules without using fusible links, and without the complexity and delay times associated with central mapping units. The present invention satisfies this need.

SUMMARY OF THE INVENTION

The present invention resides in a distributed mapping technique for configuring multiple subsystems into a single system. Basically, and in general terms, the system of the invention comprises address bus means for selecting a particular subsystem for use in an operation or for performance of some function, and mapping circuitry associated with each of the subsystems. The mapping circuitry includes first storage means, for registering a physical address of the subsystem, second storage means, for registering a logical address for accessing the subsystem, means for modifying the logical address of the subsystem, means for comparing the logical address of the subsystem with an address supplied on the address bus means, and means for activating the subsystem in response to the detection of a match by the means for comparing.

The system of the invention operates in two distinct modes: a configuration mode and an operational mode. In the configuration mode, the system is supplied with pairs of physical and logical addresses. For each subsystem, uniquely identified by its physical address, a logical address is stored in the mapping circuitry associated with the subsystem. For those subsystems that are redundant or defective, a special or null logical address is stored. In the operational mode, logical addresses are supplied through the address bus means, and appropriate physical subsystems are activated without any mapping delay, since the map relating physical and logical addresses has already been stored in a distributed manner.

More specifically, the means for modifying the logical address of a subsystem includes means for comparing the physical address of the subsystem with a physical address supplied on the address bus means and generating a match signal if the physical address matches the address on the address bus means. The means for modifying the logical address further includes means responsive to the match signal, for enabling the transfer of a logical address from the address bus means to the second storage means.

In one disclosed embodiment of the invention, the address bus means is a single address bus. In the configuration mode, physical and logical addresses appear on the address bus in an alternating sequence. In a first phase of operation, a physical address is present on the address bus, and a comparison is made with the physical address of each subsystem. In one of the subsystems, a match signal is generated to enable the transfer of a logical address from the bus in a second phase of operation. This logical address is stored in the second storage means for subsequent use in addressing the subsystem.

In another disclosed embodiment, the address bus means includes a physical address bus and a logical address bus. Therefore, physical and logical addresses do not have to be multiplexed on the same bus, but the sequence of operations is basically the same as before.

It will be appreciated from the foregoing that the present invention represents a significant advance in the field of redundancy systems. In particular, the invention provides a technique for mapping logical to physical addresses without the need for a central mapping unit and without using fusible links and similar devices to effect configuration of multiple subsystems or modules. The mapping information used in the system of the invention may be derived from on-line testing of the subsystems, or from off-line testing performed after fabrication. In any event, the system of the invention permits convenient reconfiguration of the available subsystem modules, without the need to physically alter module interconnections and without a central mapping unit. Other aspects and advantages of the invention will become apparent from the following more detailed description, taken in conjunction with the accompanying drawings.

BRIEF DESCRIPTION OF THE DRAWINGS

FIG. 1 is a simplified block diagram showing multiple subsystems interconnected in accordance with the invention;

FIG. 2 is an exemplary logic diagram of one of the comparators used in the system of FIG. 1; and FIG. 3 is a block diagram similar to FIG. 1, showing the invention as applied to a random access memory system.

DESCRIPTION OF THE PREFERRED EMBODIMENT

As shown in the drawings for purposes of illustration, the present invention is concerned with redundancy systems and techniques for interconnecting multiple subsystems, of which some are spare or defective. The most common approach to this problem is to employ a central mapping unit, which effects a translation from logical subsystem addresses to physical subsystem addresses, but interposes time delays in accessing the subsystems.

In accordance with the invention, mapping between logical and physical addresses is effected in a distributed manner by mapping circuitry associated with each of the subsystems. FIG. 1 shows an electronic system 10 for performing an unspecified function, the system comprising multiple subsystems indicated by SS1, SS2 . . . and SSM. The mapping circuitry associated with each subsystem includes first and second registers R1 and R2, first and second comparators C1 and C2, register control circuitry RCC and subsystem control circuitry SCC. The first comparator C1 receives a first input over line 12 from an address bus 13, has an enable terminal 14 connected to an enable/disable bus 15, and receives a second input over line 16 from the first register R1. The first comparator C1 generates an output signal on line 18 to indicate whether or not there is a match between the addresses impressed on the input lines 12 and 16. This output signal is transmitted to the register control circuit RCC, which, in turn, provides an enabling signal on line 20, to enable the transfer of an address from the address bus 13 to the second register R2.

It will be understood that, although the address bus 13 and the comparator input lines 12 and 14 are shown as single lines, the address quantities being handled by the circuitry are, in general, multi-bit quantities and multiple lines will be needed. The same consideration applies to the second comparator C2.

The second comparator C2 has a first input line 22 derived from the address bus 13, an enable input line 24 supplied from the enable/disable bus 15 through an inverter I1, and a second input line 26 derived from the second register R2. The second comparator C2 provides a match signal on its output line 28 to the subsystem control circuitry (SCC). The latter generates a control signal on line 30 to activate the subsystem circuitry 34 associated with this subsystem SS1.

In operation, the system 10 first runs in a configuration mode in which logical addresses are stored in the second register R2 of each subsystem. This is accomplished by placing successive pairs of physical and logical addresses on the address bus 13. When a physical address is impressed on the bus 13, and the enable/disable bus 15 is placed in condition to enable the first comparator C1, the physical address on the bus is compared with the physical address stored in the first register R1 of each subsystem. In the subsystem in which a matching physical address is found, the first comparator C1 generates a match signal on line 18, which conditions the second register R2 to receive a logical address subsequently impressed on the address bus 13.

In a second phase of operation in the configuration mode, a logical address is received by comparator C2 over line 22 and is simultaneously input to the second register R2. This logical address is also supplied to the comparator C2 over line 26 from register R2. A match signal will be generated on line 28, and the subsystem control circuitry SCC will activate the subsystem circuitry 34. In the embodiment of the invention illustrated in FIG. 1, the subsystem circuitry 34 receives test data at a data terminal 32, from a data bus 35. The subsystem circuitry 34 is electrically checked after activation, by application of the test data and using computer-aided testing procedures. If the subsystem is found to be operational and within its predefined operating specifications, the logical address previously stored in the second register R2 is left in place and becomes permanently associated with this particular subsystem. If the test procedures determine that the subsystem is defective in some respect, the logical address stored in register R2 is changed to a null pattern used to denote a defective or out-of-service subsystem. In the exemplary system, the storing of a null address in R2 is accomplished by enabling the first comparator C1, disabling the second comparator C2, and applying the appropriate physical address to the address bus 13, to select this subsystem again, followed by a null address, such as all zeros or all ones, to be stored in the second register R2.

It will be understood that this procedure described for testing the subsystem circuitry is not a critical element of the invention. The identity of defective of spare subsystems may be known in advance of the configuration procedure, either from tests performed during manufacturing, or from other sources. The configuration procedure in its simplest form consists of transmitting pairs of physical and logical addresses to the multiple subsystems. The physical address selects a unique subsystem, and then the corresponding logical address address is stored in the second register R2 of the selected subsystem.

In normal operation of the system 10, subsystems are addressed by their logical addresses and the second comparator C2 is enabled. If the address on the address bus 13 is the same as the address stored in the register R2, the comparator C2 generates a match signal and the subsystem circuitry 34 is activated. Typically, but not necessarily, the logical addresses are also unique, i.e. each logical address is associated with only one physical address, and the application of a logical address to the bus 13 results in the selection of only one physical subsystem.

It will be observed from this description that there is no need for a central mapping unit to store and assign a logical address to each subsystem. Each subsystem in effect performs part of the mapping function. This distributed mapping arrangement eliminates the time delays associated with central mapping units.

FIG. 2 shows a typical arrangement for implementing the comparator C1, comprising two exclusive OR (XOR) gates G1 and G2 with inverted outputs, and two AND gates G3 and G4. The second comparator C2 can be an identical circuit. In this exemplary embodiment, the register R1 is considered to be a two-bit register and the address bus 13 is considered to be a two-bit bus. Lines 12(1) and 12(2) from the address bus 13 are connected as inputs to the XOR gates G1 and G2, respectively, and lines 16(1) and 16(2) from register R1 are connected as second inputs to the same XOR gates. The inverted output from XOR gate G1, on line 50, is applied as an input to AND gate G3, and the inverted output from XOR gate G2, on line 52, is applied as a second input to the same AND gate. The output of AND gate G3 forms one input of the second AND gate G4, the other input of which is derived from line 14, the enabling line to the comparator.

It will be seen from FIG. 2 that AND gate G3 provides a logical "1" output only if both bits of the inputs on lines 12 and 16 match. If one bit of the inputs on lines 12 and 16 does not match, the corresponding XOR gate will produce a logical "0" inverted output, as will the AND gate G3. When both bits of the input address match, AND gate G3 will produce a logical "1" output, but the comparator circuit will produce a logical "1" output only if an enabling signal is applied to the second AND gate G4 over line 14.

The specific configuration of register control circuit RCC will depend on the the form in which the register R2 is implemented. If R2 is a shift register, RCC can be a two-input AND gate (not illustrated) having a first input terminal coupled to line 18, a second input terminal coupled to receive a clock signal, and an output terminal coupled to line 20 and to a clock terminal of the register R2. When the signal on line 18 is a logical "0", then the output of RCC is also a logical "0" and the shift register R2 is disabled such that a logical address cannot be entered into it. On the other hand, if the signal on line 18 is a logical "1" the output of RCC is a clock signal that enables register R2 to receive and store a logical address. Another possible configuration is for R2 to be a parallel register, in which case the circuit RCC need only be a single wire connecting lines 18 and 20.

The circuit configuration of the subsystem control circuit SCC will depend on the nature of the subsystem to be controlled. In some cases, SCC can simply be a wire connecting lines 28 and 30. In other cases, SCC may include a field-effect transistor having a gate terminal connected to line 28, a drain terminal connected to line 30 and a source terminal also connected to the subsystem circuitry 34. The transistor then acts as a simple switch to activate the subsystem circuitry.

FIG. 3 shows a random access memory system constructed in accordance with the invention. The components of the subsystems, referred to as SS1A, SS2A and so forth, are practically identical to the components described with reference to FIG. 1, and are referred to by the same reference numerals and labels, except that an "A" suffix is added to each. In the embodiment illustrated in FIG. 3, there is a logical address bus 13.1 and a location address bus 13.2 for supplying physical addresses. Thus the logical and physical addresses are not multiplexed as in the FIG. 1 embodiment. However, operation of the subsystem mapping arrangement is basically the same. An enable/disable bus 15A performs the same function as in the FIG. 1 embodiment, enabling either the first comparator C1 or the second comparator C2.

The only other difference in the FIG. 3 embodiment is that, since the subsystem circuit 34 is a random access memory module, address lines 36 are needed to provide a local memory address from a memory address bus 37. This is used to address each memory location within a selected subsystem module.

It will be appreciated from the foregoing that the present invention represents a significant advance in the field of redundancy systems in electronic devices. In particular, the invention provides a system of distributed mapping of physical and logical addresses, to avoid the disadvantages of central mapping units and other techniques for associating physical and logical addresses.

It will be understood that the embodiments described in this specification are exemplary only and could be easily modified without departing from the scope of the invention. For example, the register R1 can be a read-only memory or other form of hard-wired register. Also, the comparators C1 and C2 can be implemented in a number of different ways and need not be identical to each other. The enable/disable bus could also have been implemented as two separate buses. As already mentioned, the nature and function of the subsystem circuitry can vary widely without affecting the invention. Finally, although the invention is well suited for use in wafer-scale technology, this is not a necessary limitation of the invention. When used in conjunction with wafer-scale devices, the entire system can be fabricated in or on semiconductor materials based on silicon, gallium arsenide, or possibly other materials. In brief, the invention should not be limited by the details of this specification, but only by the scope of the following claims.

I claim:

1. A distributed mapping system for interconnecting multiple subsystems, some of which are redundant or defective, comprising:
    address bus means for selecting a particular subsystem for use in an operation or for performance of some function; and
    mapping circuitry associated with each of the subsystems, and having
        first storage means, for registering a physical address of the subsystem,
        second storage means, for registering a logical address for accessing the subsystem,
        means for modifying the logical address of the subsystem during a configuration mode of operation,
        means for comparing the logical address of the subsystem with an address impressed on the address bus means during a normal mode of operation, and
        means for activating the subsystem in response to the detection of a match by the means for comparing;
    and wherein the means for modifying the logical address of the subsystem includes
        means for comparing the physical address of the subsystem stored in the first storage means with a physical address impressed on the address bus means during the configuration mode of operation, and generating a match signal if the physical address matches the address on the address bus means, and
        means responsive to the match signal, for enabling the transfer of a logical address from the address bus means to the second storage means, for later use in the normal mode of operation.

2. A distributed mapping system as defined in claim 1, wherein:
    the address bus means has only a single address bus, the use of which is multiplexed to configure the system by associating physical and logical addresses.

3. A distributed mapping system as defined in claim 1, wherein:
    the address bus means includes a physical address bus for selecting a particular physical subsystem, and a logical address bus for storing a logical address in the selected physical subsystem, and for selecting subsystems in accordance with their previously stored logical addresses.

4. A distributed mapping system as defined in claim 1, and further comprising:
means for storing a null logical address in the second storage means of selected subsystems, to indicate that the selected subsystems are defective or out of service for some other reason.

5. A distributed mapping system as defined in claim 1, wherein:
the multiple subsystems are formed as part of a common semiconductor wafer.

6. A distributed mapping system as defined in claim 5, wherein:
the semiconductor wafer is of silicon material.

7. A distributed mapping system as defined in claim 5, wherein:
the semiconductor wafer is of gallium arsenide material.

8. A distributed mapping system as defined in claim 1, wherein:
the system is formed as a plurality of individual semiconductor chips, each containing one or more subsystems, and mounted on a semiconductor wafer.

9. A distributed mapping system for interconnecting multiple subsystems, some of which are redundant or defective, each subsystem having a unique physical address and having circuitry connected to perform some desired function, the system comprising:
address bus means for selecting a subsystem for purposes of configuring the mapping system, or for performance of the desired function;
mapping circuitry associated with each of the subsystems, and having
a first register, for storing the physical address of the subsystem,
a second register, for storing a logical address of the subsystem,
a first comparator circuit for comparing the physical address of the subsystem with a physical address supplied on the address bus means,
a register control circuit activated only in response to a match signal from the first comparator circuit, for generating a register control signal that enables the second register to receive and store a logical address placed on the address bus means immediately after the physical address with which it is to be associated,
a second comparator circuit for comparing the logical address stored in the second register with a logical address placed on the address bus means, to permit logical addressing of the subsystems after their logical addresses have been stored in the second registers, and
a subsystem control circuit, responsive to a match signal from the second comparator circuit, for activating the corresponding subsystem circuitry.

10. A distributed mapping system as defined in claim 9, and further comprising:
means for storing a null code in each second register associated with a defective or spare subsystem that is to be excluded from interconnection with other subsystems.

11. A distributed mapping system as defined in claim 9, wherein:
the address bus means has only a single address bus, the use of which is multiplexed to configure the system by associated physical and logical addresses.

12. A distributed mapping system as defined in claim 9, wherein:
the address bus means includes a physical address bus for selecting a particular physical subsystem, and a logical address bus for storing a logical address in the selected physical subsystem, and for selecting subsystems in accordance with their previously stored logical addresses.

13. A distributed mapping system, comprising:
a plurality of subsystems, some of which are redundant or defective;
data bus means, interconnecting the subsystems, for communicating information with the subsystems;
logical address bus means, interconnecting the subsystems, for providing a logical address bus signal designating a particular subsystem which is to communicate with the data bus; and
enable/disable means for for transmitting a disable signal to the subsystems when the logical addresses of one or more of the subsystems is to be reassigned;
wherein each subsystem includes a mapping circuit having
first register means for storing a logical address for identifying the subsystem,
first comparator means for comparing the logical address stored in the first register means of the subsystem with the logical address designated by the logical address bus signal and, if said two logical addresses match, connecting the subsystem to communicate with the data bus in response to a match signal from the first comparator means, and
means for modifying the logical address stored in the first register means in response to the disable signal.

14. A distributed mapping system as defined in claim 13, wherein, in each subsystem, the means for modifying the logical address includes:
means, responsive to the disable signal, for storing in the first register means the logical address designated by the logical address bus signal.

15. A distributed mapping system as defined in claim 13, and further comprising:
a physical address bus, interconnecting the subsystems, for providing a physical address bus signal designating a particular subsystem whose logical address is to be reassigned;
wherein, in each subsystem, the mapping circuit further includes a second register means for storing a physical address identifying the subsystem; and
wherein, in each subsystem, the means for modifying the logical address includes
second comparator means, responsive to the disable signal, for comparing the physical address stored in the second register means of the subsystem with the physical address designated by the physical address bus signal and, if said two physical addresses match, storing in the first register means the logical address designated by the logical address bus signal.

16. A distributed mapping system as defined in claim 13, and further comprising:

means for storing a null logical address in the first register means of selected subsystems, to indicate that the selected subsystems are defective or out of service for some other reason.

17. A distributed mapping system as defined in claim 13, wherein:
the multiple subsystems are formed as part of a common semiconductor wafer.

18. A distributed mapping system as defined in claim 17, wherein:
the semiconductor wafer is of silicon material.

19. A distributed mapping system as defined in claim 17, wherein:
the semiconductor wafer is of gallium arsenide material.

20. A distributed mapping system, as defined in claim 13, wherein:
the system is formed as a plurality of individual semiconductor chips, each containing one or more subsystems, and mounted on a semiconductor wafer.

* * * * *